United States Patent
Yusuf et al.

(10) Patent No.: US 9,900,315 B2
(45) Date of Patent: Feb. 20, 2018

(54) ENABLING AND INHIBITING SYNCHRONIZATION OF PRIVACY SETTINGS

(71) Applicant: GM GLOBAL TECHNOLOGY OPERATIONS LLC, Detroit, MI (US)

(72) Inventors: Munib Ahmed Yusuf, Scarborough (CA); Shaun S. Marshall, Port Berry (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 124 days.

(21) Appl. No.: 14/928,069

(22) Filed: Oct. 30, 2015

(65) Prior Publication Data
US 2017/0126680 A1    May 4, 2017

(51) Int. Cl.
*H04L 29/06*     (2006.01)
*H04L 29/08*     (2006.01)
*H04W 4/00*      (2018.01)
*H04W 12/02*     (2009.01)

(52) U.S. Cl.
CPC .............. *H04L 63/10* (2013.01); *H04L 67/12* (2013.01); *H04W 4/008* (2013.01); *H04W 12/02* (2013.01)

(58) Field of Classification Search
CPC ........ H04L 63/10; H04L 67/12; H04W 4/008; H04W 12/02
See application file for complete search history.

(56) References Cited

U.S. PATENT DOCUMENTS

| | | | |
|---|---|---|---|
| 7,418,277 B2 | 8/2008 | Tsai | |
| 8,621,645 B1 * | 12/2013 | Spackman | G06F 21/62 726/26 |
| 8,731,530 B1 | 5/2014 | Breed et al. | |
| 9,083,581 B1 * | 7/2015 | Addepalli | H04W 4/046 |
| 9,099,000 B2 * | 8/2015 | Schalk | H04M 1/72538 |
| 9,104,537 B1 * | 8/2015 | Penilla | G06F 17/00 |
| 9,219,992 B2 * | 12/2015 | Wu | H04W 4/027 |
| 9,288,387 B1 * | 3/2016 | Keller | H04N 21/44218 |
| 9,326,092 B2 * | 4/2016 | Nelson | H04W 4/008 |
| 9,432,828 B1 * | 8/2016 | Tu | H04W 4/22 |

(Continued)

FOREIGN PATENT DOCUMENTS

CN       106650470 A    5/2017
DE       102016119723 A1   5/2017

*Primary Examiner* — Beemnet Dada
*Assistant Examiner* — Stephen Gundry
(74) *Attorney, Agent, or Firm* — Harness, Dickey & Pierce, P.L.C.

(57) ABSTRACT

A system includes a vehicle communications platform (VCP) operatively disposed in a vehicle and a control device. The control device selects a privacy ON mode or a privacy OFF mode. The privacy ON mode enables the VCP to synchronize a privacy setting of a mobile communications device to a vehicle notification setting, and is triggered when the privacy setting of the device is on, and either at least one passenger is present in the vehicle or a user indicates that the VCP should synchronize the privacy setting to the vehicle notification setting. The privacy OFF mode inhibits the VCP from synchronizing the privacy setting to the vehicle notification setting, and is triggered when the privacy setting of the device is off, or no passengers are present in the vehicle, or the user indicates that the VCP should not synchronize the privacy setting to the vehicle notification setting.

19 Claims, 3 Drawing Sheets

(56) References Cited

U.S. PATENT DOCUMENTS

| | | | |
|---|---|---|---|
| 2010/0201505 A1 | 8/2010 | Honary et al. | |
| 2011/0177802 A1* | 7/2011 | Gupta | H04L 12/66 455/418 |
| 2012/0142367 A1* | 6/2012 | Przybylski | H04W 4/046 455/456.1 |
| 2013/0099892 A1* | 4/2013 | Tucker | G07C 9/00309 340/5.61 |
| 2013/0271275 A1* | 10/2013 | Schalk | H04M 1/72538 340/438 |
| 2013/0309977 A1* | 11/2013 | Heines | G06F 8/70 455/67.7 |
| 2014/0032800 A1* | 1/2014 | Peirce | H04L 67/12 710/105 |
| 2014/0200740 A1* | 7/2014 | Lavi | G07C 5/008 701/2 |
| 2014/0274027 A1* | 9/2014 | Pandya | H04W 4/001 455/420 |
| 2014/0379169 A1* | 12/2014 | Camacho | B60R 16/037 701/2 |
| 2014/0380505 A1* | 12/2014 | Camacho | G06F 21/31 726/28 |
| 2015/0052619 A1* | 2/2015 | Kwak | G06F 21/6245 726/28 |
| 2015/0095156 A1* | 4/2015 | Sauerbrey | H04L 67/303 705/14.58 |
| 2015/0126143 A1* | 5/2015 | Van Wiemeersch | H04B 1/082 455/160.1 |
| 2015/0199855 A1* | 7/2015 | Alam | G07C 5/008 701/31.5 |
| 2015/0203125 A1* | 7/2015 | Penilla | G06F 21/445 701/1 |
| 2015/0304324 A1* | 10/2015 | Kirsch | H04L 63/0876 726/5 |
| 2015/0341440 A1* | 11/2015 | Nelson | H04W 76/007 455/41.2 |
| 2015/0341766 A1* | 11/2015 | Nelson | H04W 4/22 455/404.2 |
| 2015/0341767 A1* | 11/2015 | Nelson | G08B 25/016 455/404.2 |
| 2015/0358314 A1* | 12/2015 | Glik | H04L 63/0861 726/7 |
| 2015/0365519 A1* | 12/2015 | Ishfaq | H04M 1/6091 455/414.1 |
| 2016/0037307 A1* | 2/2016 | Roth | H04W 4/046 709/206 |
| 2016/0050309 A1* | 2/2016 | Gooberman | H04M 1/72577 455/418 |
| 2016/0080500 A1* | 3/2016 | Penilla | H04W 4/003 709/226 |
| 2016/0192185 A1* | 6/2016 | Henry | H04W 12/02 455/411 |
| 2016/0241645 A1* | 8/2016 | Sabbaghian | H04L 67/12 |
| 2016/0266886 A1* | 9/2016 | Sarkar | G06F 8/65 |
| 2016/0381027 A1* | 12/2016 | Mitchell | H04L 63/10 726/3 |
| 2017/0048080 A1* | 2/2017 | Grimm | H04L 12/40032 |
| 2017/0104824 A1* | 4/2017 | Bajwa | H04L 61/30 |

\* cited by examiner

ENABLING AND INHIBITING SYNCHRONIZATION OF PRIVACY SETTINGS

TECHNICAL FIELD

The present disclosure relates generally to enabling and inhibiting synchronization of privacy settings.

BACKGROUND

Many consumer electronic devices are equipped with short-range wireless (e.g., BLUETOOTH®) capabilities that allow two devices to automatically synchronize and communicate with one another after an initial device pairing. BLUETOOTH® is an open wireless technology standard that allows devices to communicate with one another over short distances (e.g., 100 meters or less). BLUETOOTH® may be used to automatically link two wireless devices, such as a personal device (e.g., phone) and another wireless communicating device (e.g., tablet or other computer, headset, etc.), for automatically downloading files, messages, music, video, and for various other applications. Vehicles are often equipped with in-vehicle communications platforms (e.g., telematics unit and/or infotainment units) or other in-vehicle controllers equipped with BLUETOOTH® or other short-range wireless capabilities that enable hands free calling, messaging, and other like features.

SUMMARY

A system is disclosed herein. An example of the system includes a vehicle, a vehicle communications platform, and a control device. The vehicle communications platform is operatively disposed in the vehicle and is in communication with a mobile communications device. The control device selects a privacy ON mode or a privacy OFF mode responsive to a privacy setting received from the mobile communications device. The privacy ON mode enables the vehicle communications platform to synchronize the privacy setting of the mobile communications device to a vehicle notification setting. The privacy ON mode is triggered when the privacy setting of the paired device is on, and either passenger presence data indicates that at least one passenger is present in the vehicle or a vehicle operator indicates through the user interface that the vehicle communications platform should synchronize the privacy setting of the paired device to the vehicle notification setting. The privacy OFF mode inhibits the vehicle communications platform from synchronizing the privacy setting of the mobile communications device to the vehicle notification setting. The privacy OFF mode is triggered when the privacy setting of the paired device is off, or passenger presence data indicates that no passengers are present in the vehicle, or the vehicle operator indicates through the user interface that the vehicle communications platform should not synchronize the privacy setting of the paired device to the vehicle notification setting.

In an example of a method for improving a function of a vehicle communications platform, the vehicle communications platform recognizes a mobile communications device. A control device in communication with the vehicle communications platform identifies that a privacy setting of the mobile communications device is on. A display of a user interface is caused to show a message inquiring whether the privacy setting of the paired device is to be implemented in a vehicle. In response to an input received at the user interface, the control device is triggered to enter either a precursor mode to a privacy ON mode or a privacy OFF mode. The privacy ON mode enables the vehicle communications platform to synchronize the privacy setting of the mobile communications device to a vehicle notification setting. The privacy OFF mode inhibits the vehicle communications platform from synchronizing the privacy setting of the mobile communications device to the vehicle notification setting.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the system and method disclosed herein enable (or inhibit) a vehicle communications platform to synchronize (or from synchronizing) a privacy setting of a connected mobile communications device to a vehicle notification setting. Mobile communications devices that have previously paired with a vehicle may automatically synchronize and communicate with the vehicle whenever they reenter the vehicle. Mobile communications device may also communicate with the vehicle whenever they are plugged in (e.g., via a USB cord, or the like). Incoming calls or messages received on the connected device may then be automatically processed on the vehicle's speakers (e.g., ringing sound) and display (e.g., message containing caller's name and number). In examples herein, a privacy setting of a connected device may be synchronized with a vehicle notification setting so that an incoming call or message received on the paired device is not processed on the vehicle's speakers and/or display.

In the examples disclosed herein, the vehicle includes a control device. The control device is capable of selecting one of two modes, including a privacy ON mode and a privacy OFF mode. When the privacy ON mode is selected, the control device enables the vehicle communications platform to synchronize a privacy setting of a connected mobile communications device with a notification setting of the vehicle. The vehicle communications platform may be a peripheral device that is responsive to the instructions of the control device. When the privacy OFF mode is selected, the control device inhibits the vehicle communications platform from synchronizing a privacy setting of a connected mobile communications device to a vehicle notification setting. In the examples disclosed herein, the mode of the control device depends upon whether a privacy setting of the connected device is on, and/or whether a privacy mode preference indicates that the privacy setting of the connected device should not be implemented in the vehicle, and/or whether a passenger is present in the vehicle. The ability of the control device to switch between the privacy ON and OFF modes provides a user or vehicle operator with the ability to use hands free calling and messaging in some circumstances (e.g., no passengers are present in the vehicle) while allowing the user to maintain privacy in other circumstances (e.g., passengers are present in the vehicle). The control device also improves the function of the vehicle communications platform, which responds to the privacy modes selected by the control device by either processing incoming calls or not processing incoming calls.

As used herein a "vehicle notification setting" may be an audio notification setting, a display notification setting, or both. A "notification" may be any audio or visual alert of the receipt, sender, and/or contents of a phone call, text message, email, or professional or social media message. A "privacy setting" of a connected device may be silent mode (i.e., volume turned off) or a setting of a vehicle-related application resident on the memory of the connected device. A "user" or vehicle operator" may be either a driver or a passenger.

Figure 1:
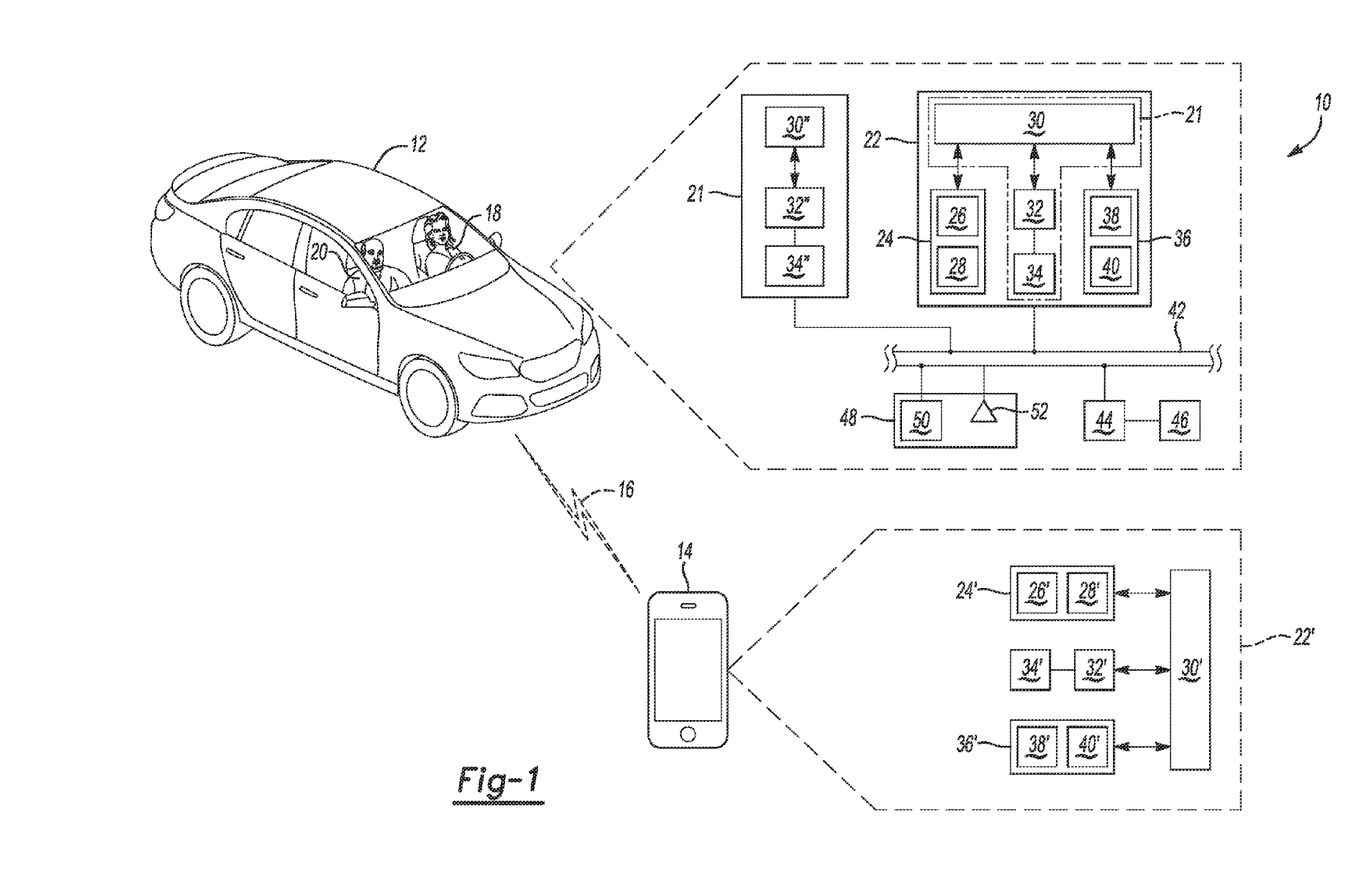
FIG. 1 is a schematic view of an example of a system for enabling or inhibiting synchronization of privacy settings.

Referring now to FIG. 1, an example of a system 10 for enabling or inhibiting synchronization of privacy settings is depicted. In one example the system 10 includes the vehicle 12 and the connected device 14.

Communications (e.g., privacy setting data) may be transmitted to, from, and/or between short-range wireless communication modules 24, 24' of the vehicle 12 and/or the connected device 14. Each of these modules 24, 24' is equipped with hardware that supports short-range wireless communication technology. Examples of short-range wireless communication technologies include standard BLUETOOTH® and various classes thereof, dedicated short-range communications (DSRC), or WI-FI™ and various classes thereof. Additionally, each of the modules 24, 24' includes a respective transceiver 26, 26' (or a transmitter and a receiver) and a respective node 28, 28'. Each transceiver 26, 26' includes a respective signal emitter for transmitting signals/data and a respective signal receiver for receiving signals/data. The respective nodes 28, 28' allow the module 24, 24' to communicate, via a short-range wireless communication link 16, with other device(s) that are short-range wireless communication enabled. The node 28, 28' provides the autonomous communication link 16 with the other enabled device(s) after an initial pairing between the two modules 24, 24'. The nodes 28, 28' may be standalone chipsets/modems, or may be integrated as part of the transceiver 26, 26', or may be integrated as part of any other circuit in the module 24, 24'.

It is to be understood that each of the modules 24, 24' has a unique identifying code (e.g., a wireless connection key) that is used to pair the respective module 24, 24' with a module of another enabled device. Two devices are paired with each other when the modules 24, 24' of those devices exchange their unique identifying codes with each other. For example, the module 24 in the vehicle 12 and the module 24' in the mobile communications device 14 are paired when they exchange their unique identifying codes with each other. This enables the vehicle 12 and the connected device 14 to communicate typically under a secured connection (e.g., autonomous communication link 16).

As a more specific example, initial pairing may involve setting the mobile communications device 14 to a short-range wireless discovery mode (such as by selecting, on the mobile communications device 14, a discovery mode function as a menu option, icon, or the like). While in the discovery mode, other devices configured for short-range wireless communications (such as the vehicle 12 including module 24) are allowed to detect the presence of the mobile communications device 14. When the module 24 locates the mobile communications device 14, the mobile communications device 14 automatically provides the type of device it is (e.g., a smart phone, a tablet computer, etc.) and its short-range wireless connection name. The mobile communications device 14 may then prompt the user to enter a security code/password, and then the unique identifying code of the mobile communications device 14 is sent to the module 24 of the vehicle 12. Upon receiving the unique identifying code, the module 24 sends its own unique identifying code to the module 24' of the mobile communications device 14 to ultimately pair the two devices 12 and 14 together.

In another example, the vehicle 12 may be set to a short-range wireless discovery mode (e.g., by selecting, on the vehicle 12, a discovery mode function as a menu option, icon, or the like). While in the discovery mode, the mobile communications devices 14 including module 24' is allowed to detect the presence of the vehicle 12. When the module 24' locates the vehicle 12, the vehicle 12 automatically provides the type of device it is (e.g., a vehicle short-range wireless communication modules 24) and its short-range wireless connection name. The vehicle 12 may then prompt the user to enter a security code/password, and then the unique identifying code of the vehicle 12 is sent to the module 24' of the mobile communications device 14. Upon receiving the unique identifying code, the module 24' sends its own unique identifying code to the module 24 of the vehicle 12 to ultimately pair the two devices 12 and 14 together.

In still another example, the initial pairing may be simplified. Once the vehicle 12 and the mobile communications device 14 have detected the presence of each other, the modules 24, 24' may simply agree that the unique identifying codes of the devices 12 and 14 match the codes received and pair the devices 12 and 14 without prompting the user to enter a security code/password.

After the initial pairing process, the respective devices 12, 14 will automatically establish the communication link 16 without having to go through the initial pairing process again, as long as the devices 12, 14 are within short range of one another.

Alternatively, communications (e.g., privacy setting data) may be transmitted to, from, and/or between the vehicle 12 and the connected device 14 through a wired connection (not shown). In an example, the vehicle 12 may include a universal serial bus (USB) port through which the connected device 14 may be connected to the vehicle 12 by a cable with a USB plug at one end and a plug that fits a port of the connected device 14 at the other end.

In addition to the short-range wireless communication module 24, 24', each of the vehicle 12 and the connected device 14 includes several other components. The vehicle 12 and the connected device 14 will now be described separately.

In the examples disclosed herein, the vehicle 12 may be a car, motorcycle, truck, or recreational vehicle (RV). The vehicle 12 is equipped with suitable hardware and computer readable instructions/code that allow it to communicate (e.g., transmit and/or receive voice and data communications) over the short-range wireless communication link 16 and to enable and disable the short-range wireless communication module 24. In the examples disclosed herein, the vehicle 12 may be a listening/scanning device. As such, short-range wireless communication module 24 may be in a scanning mode where it continuously scans for a signal from another enabled device.

At least some of the hardware and computer readable instructions/code are embodied in a vehicle communication/communications platform (VCP) 22. In an example, the VCP 22 is an on-board vehicle dedicated communications and entertainment device. In another example (not shown), the VCP 22 is an on-board vehicle dedicated communications device (e.g., a telematics unit), and the vehicle 12 includes a separate on-board vehicle dedicated entertainment device (e.g., an infotainment unit). Whether integrated into a single unit (e.g., VCP 22) or included as separate units, the on-board vehicle dedicated communications and entertainment device(s) include hardware components that are capable of running computer readable instructions/code 34, which are embodied on non-transitory, tangible computer readable media.

The VCP 22 may provide a variety of services. One example of these services includes the VCP 22 restricting or processing a notification of an incoming call, text, email, media message, etc. based, at least in part on whether the control device 21 selects the privacy ON mode or privacy OFF mode. Several other examples of the services may include, but are not limited to: turn-by-turn directions and other navigation-related services provided in conjunction with a location detection unit; airbag deployment notification and other emergency or roadside assistance-related services provided in connection with various sensor interface modules 44 and sensors 46 located throughout the vehicle 12; and infotainment-related services where music, Web pages, movies, television programs, videogames and/or other content is downloaded by the VCP 22 via a vehicle bus system 42 and an audio bus system (not shown). The listed services are by no means an exhaustive list of all the capabilities of the VCP 22, but are simply an illustration of some of the services that the VCP 22 is capable of offering.

The VCP 22 may be used for vehicle communications. In some instances, vehicle communications are enabled through the VCP 22 via a communications module 36, which includes a cellular chipset/component 38 for voice communications and a data transmission system 40 for data transmission. The cellular chipset/component 38 of the VCP 22 may be an analog, digital, dual-mode, dual-band, multi-mode and/or multi-band wireless transceiver. The cellular chipset/component 38 uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

In an example, the data transmission system 40 may include a packet builder, which is programmed to make decisions about what packet to send (e.g., bandwidth, data to include, etc.) and to actually build a packet data message. In another example, the data transmission system 40 may include a wireless modem, which applies some type of encoding or modulation to convert the digital data so that it can communicate through a vocoder or speech codec incorporated in the cellular chipset/component 38. It is to be understood that any suitable encoding or modulation technique that provides an acceptable data rate and bit error may be used with the examples disclosed herein. While examples have been provided, it is to be understood that any suitable data transmission system 40 may be used.

The VCP 22 also includes an electronic processing device 30 operatively coupled to one or more types of electronic memory 32. In an example, the electronic processing device 30 is a microprocessor. In other examples, the electronic processing device 30 may be a micro controller, a controller, and/or a host processor. In another example, electronic processing device 30 may be an application specific integrated circuit (ASIC). The electronic memory 32 of the VCP 22 may be an encrypted memory that is configured to store i) computer readable instructions/code 34 to be executed by the processor 30, ii) data associated with the various systems of the vehicle 12 (i.e., vehicle data, VIN, etc.), iii) a privacy mode preference, and/or the like. The electronic memory 32 may be a non-transitory, tangible computer readable media (e.g., RAM).

The VCP 22 is operatively connected to the vehicle bus system 42. The vehicle bus system 42 may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The vehicle bus system 42 enables the vehicle 12 to send signals (e.g., real-time bus messages, alert notifications) from the VCP 22 to various units of equipment and systems (e.g., display 50 and speakers 52). The vehicle bus system 42 also enables the vehicle 12 to receive signals at the VCP 22 from various units of equipment and systems (e.g., vehicle sensors 46). An example of a signal received by the vehicle bus 42 includes a passenger presence data received by the vehicle sensors 46. An example of a signal transmitted by the vehicle bus 42 includes an incoming call notification from the processor 30 to the display 50 or speaker(s) 52 of the vehicle 12.

The vehicle 12 also includes a control device 21. The control device 21 may be a combination of hardware and software in communication with the VCP 22 (through the vehicle bus 42) or may be integrated into the VCP 22 as software that is executed by the hardware (e.g., processor 30) of the VCP 22. Whether a standalone device or resident within the VCP 22, the control device 21 improves the function of the VCP 22 by enabling the VCP 22 to synchronize, or inhibiting the VCP 22 from synchronizing a privacy setting of the connected device 14 with a vehicle notification setting. The control device 21 has a privacy ON mode and a privacy OFF mode. When in the privacy ON mode, the control device 21 enables the VCP 22 to synchronize the privacy setting of the connected device 14 with the notification setting of the vehicle 12. When in the privacy OFF mode, the control device 21 inhibits the VCP 22 from synchronizing the privacy setting of the connected device 14 to the vehicle notification setting. The control device 21 may switch between its privacy ON mode and its privacy OFF mode based on whether a privacy setting of the connected device 14 is on, and/or whether a privacy mode preference indicates that the privacy setting of the connected device 14 should not be implemented in the vehicle 12, and/or whether a passenger is present in the vehicle 12.

In an example, the control device 21 includes an electronic processing device 30" operatively coupled to one or more types of electronic memory 32". The electronic processing device 30" of the control device 21 may be similar to the processor 30 of the VCP 22, and is capable of executing the computer readable instructions 34" stored in the memory 32", which may be similar to the electronic memory 32. In the examples disclosed herein, the control device 21 is programmed to receive the privacy setting of the connected mobile communications device 14, determine whether the privacy ON mode or the privacy OFF mode should be implemented, and to instruct the VCP 22 accordingly. To perform these operations, the control device 21 executes computer readable instructions 34" that are stored on the memory 32". These instructions 34" will be described in more detail in reference to FIG. 3.

As illustrated in FIG. 1, the vehicle 12 may also include other vehicle systems that are directly or indirectly connected to the vehicle bus system 42. Example of these other vehicle systems may include a sensor interface 44 and a user interface 48.

The vehicle sensors 46 may be operatively connected to and controlled by the sensor interface 44, which is operatively connected to the vehicle bus system 42. The vehicle sensors 46 may be used to receive passenger presence data. In one example, the passenger presence data is collected by a seat belt sensor, which determines whether a passenger seat belt has been fastened. In another example, the passenger presence data is collected by an ultrasonic sensor, which uses ultrasonic wave to determine if a human shape is in a passenger seat. In another example, the passenger presence data is collected by an automatic occupancy sensor, which determines whether a passenger 20 is present in the vehicle 12 by sensing the amount of weight upon a passenger seat. In still another example, the passenger presence data is collected by a camera, which looks for passengers 20 within the vehicle 12.

The user interface 48 is operatively connected to the vehicle bus system 42. The user interface 48 allows a vehicle operator to input information and commands to the vehicle 12 and receive information from the vehicle 12. The user interface 48 may be any command-driven user interface or any menu-driven interface. In an example, the user interface 48 is a graphical user interface (GUI). In another example, the user interface 48 is a human machine interface (HMI). As shown in FIG. 1, the user interface 48 may include a display 50 and/or a speaker 52. The user interface 48 may also include a microphone (not shown).

Figure 2:
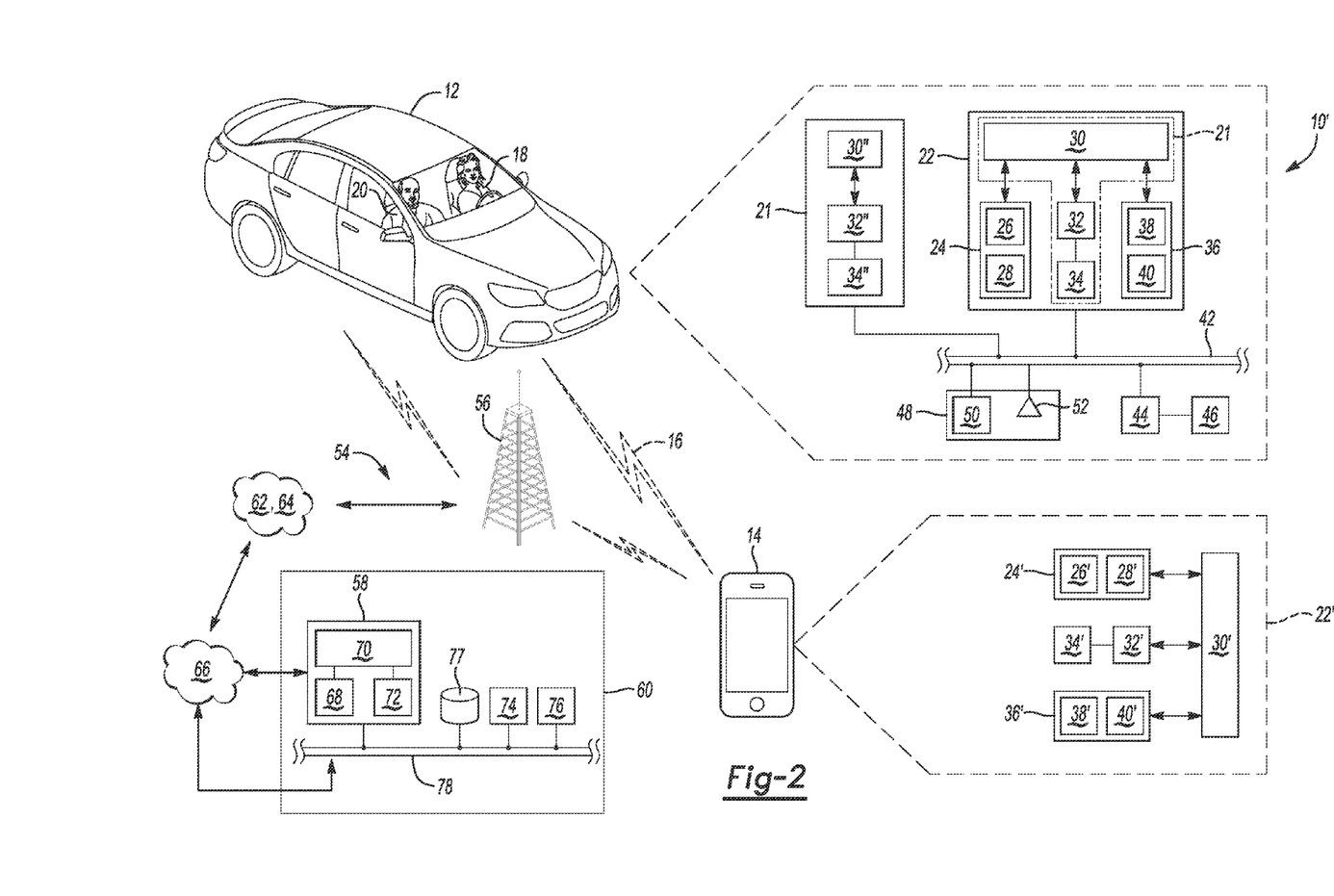
FIG. 2 is a schematic view of another example of a system for enabling or inhibiting synchronization of privacy settings.

In an example, the display 50 is a full-color touch screen display. Other examples of the display 50 include a VFD (Vacuum Fluorescent Display), an LED (Light Emitting Diode) display, an LCD (Liquid Crystal Diode) display, and/or the like. In an example, the speaker 52 is a speaker of the user interface 48 as shown in FIGS. 1 and 2. In other examples, the speaker 52 may be a standalone speaker or a vehicle speaker (not shown).

The user interface 48 may assist the control device 21 and/or the VCP 22 with a variety of services. One example of these services includes the user interface 48 allowing a vehicle operator to input a privacy mode preference. The vehicle operator may enter the privacy mode preference at the user interface 48. The privacy preference is then transmitted to the control device 21. The privacy mode preference may be immediately used by the control device to determine whether the privacy ON mode or the privacy OFF mode should be entered. Additionally, the privacy mode preference may be stored on the electronic memory 32" for later use by the control device 21. Another example of a service the user interface 48 assists in providing is hands free calling and messaging. The VCP 22 may detect an incoming call, text, etc. on the connected device 14 and transmit a notification to the user interface 48. The notification may be a visual notification processed on the display 50 and/or an audio notification processed on the speakers 52. The vehicle operator may indicate acceptance (e.g., voice command, touch screen or push button) of the call through the user interface 48. The user interface 48 may then receive the parts of the conversation spoken by the vehicle operator and output the parts of the conversation spoken by the caller.

As mentioned above, examples of the system 10 include the connected device 14. In the examples disclosed herein, the connected device 14 may be any mobile device, including a smart phone, such as a GSM/LTE phone or a GSM/CDMA/LTE phone. In other examples, the connected device 14 may be any portable device that has a mobile device communication platform 22'. Examples of other connected devices 14 include a wearable device (e.g., smart bracelet, smart watch, helmet, etc.), a tablet computer, etc., each of which may be, for example, GPS, cellular/Internet wireless communication enabled, and short-range wireless communication enabled. The connected device 14 may also be capable of being plugged into the vehicle 12.

As shown in FIG. 1, the mobile device communication platform 22' includes the short-range wireless communication module 24'. As discussed above, the short-range wireless communication capability (e.g., BLUETOOTH® and variations thereof) enables the connected device 14 to communicate with other short-range wireless communication enabled devices (e.g., vehicle 12). In the examples disclosed herein, the connected device 14 may be a listening/scanning device. As such short-range wireless communication module 24' may be in a scanning mode where it continuously scans for a signal from another enabled device.

The mobile device communication platform 22' may also include a communications module 36', which includes a cellular chipset/component 38' for voice communications and a data transmission unit 40' for data transmission. The connected device 14 also includes physical hardware (e.g., a microprocessor 30') and computer readable instructions 34' stored in an electronic memory 32'. The microprocessor 30' of the connected device 14 may be similar to the processor 30 of the vehicle 12, and is capable of executing the computer readable instructions 34' stored in the memory 32', which may be similar to the electronic memory 32.

As shown in FIG. 2, some examples of the system 10' include the vehicle 12, the connected device 14, a carrier/communication system 54, and a server 58 which may be part of a center 60 that provides back-end services to the vehicle 12. In some of the examples disclosed herein, phone calls and/or data (e.g., privacy mode preference data, etc.) may be transmitted to, from, and/or between communication component(s) of the vehicle 12, the connected device 14, and/or the server 58 using the carrier/communication system 54. Some of these communication links between the various components are shown as lightning bolts and arrows in FIG. 2.

In an example, the carrier/communication system 54 is a two-way radio frequency (RF) communication system. The carrier/communication system 54 may include one or more cell towers 56 or satellites (not shown). It is to be understood that the carrier/communication system 54 may also include one or more base stations and/or mobile switching centers (MSCs) 62 (e.g., for a 2G/3G network), one or more evolved Node Bs (eNodeB) and evolved packet cores (EPC) 64 (for a 4G (long-term evolution, LTE) network), and/or one or more land networks 66. The carrier/communication system 54 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the wireless carrier/communication system 54 may be GSM (global system for mobile telecommunications), CDMA2000, UMTS (universal mobile telecommunications system), LTE, or some other available architecture.

An Internet connection may also be utilized for the transmission of message(s), privacy mode preference data, etc. In this example, the transmission of the message(s), privacy mode preference data, etc. may be made using the carrier/communication system 54, either through the vehicle's Internet connection (e.g., when the vehicle 12 is equipped with a 4G long-term evolution, LTE, or other suitable Internet connection) or through the connected device's cellular and Internet connection.

The vehicle 12 and the connected device 14 are equipped with suitable hardware and computer readable instructions/code 34, 34' that allow them to communicate (e.g., transmit and/or receive voice and data communications) over the carrier/communication system 54. Using the communications module 36, 36', the vehicle 12 and the connected device 14 are capable of making cellular or satellite connections and/or Internet connections (over the wireless carrier/communication system 54).

The vehicle 12 may use the VCP 22 for vehicle communications over the carrier/communication system 54. The vehicle communications utilize radio or satellite transmissions to establish a voice channel with the carrier/communication system 54 such that both voice and data transmissions may be sent and received over the voice channel. In some instances, vehicle communications are enabled through the VCP 22 via the communications module 36.

The vehicle 12 or the connected device 14 may be in communication with the server 58, which is part of the center 60. As an example, the vehicle 12 may transmit a privacy mode preference (as received by the user interface 48) to the server 58 as a data message using the data transmission unit 40 and the wireless carrier/communication system 54. As another example, the connected device 14 may transmit a privacy mode preference (as received by a vehicle-related application resident, not shown, on the memory 32') to the server 58 as a data message using the data transmission unit 40' and the wireless carrier/communication system 54. Additionally, the vehicle 12 may communicate with the server 58 in order to receive privacy mode preference data.

It is to be understood that the center 60 shown in FIG. 2 may be virtualized and configured in a Cloud Computer, that is, in an Internet-based computing environment. For example, the server 58 (and other computing equipment) may be accessed as a Cloud platform service, or PaaS (Platform as a Service), utilizing Cloud infrastructure rather than hosting server 58 at the center 60. In these instances, the server 58 (and other center 60 components) may be virtualized as a Cloud resource. The Cloud infrastructure, known as IaaS (Infrastructure as a Service), typically utilizes a platform virtualization environment as a service, which may include components such as processor(s) 70, 76, server 58, and other computer equipment. In an example, the real-time services performed by the server 58 disclosed herein may be performed in the Cloud via the SaaS (Software as a Service).

The server 58 may be a system of computer hardware and computer readable instructions that is capable of supplying the vehicle 12 with data, which the VCP 22 of the vehicle 12 may use to determine which of the privacy modes of the module 24 should be triggered.

As shown in FIG. 2, the server 58 includes the processor 70, and the center 60 may also include additional processor(s) 76. The processors 70, 76 may be a controller, a host processor, an ASIC, or a processor working in conjunction with a central processing unit (CPU). The processor 70 is capable of executing the computer readable instructions that are stored on the electronic memory 68.

The server 58 also includes a server communication transceiver 72 that may be in selective communication with either or both the VCP 22 and the mobile device communications platform 22'. The server communication transceiver 72 may be any suitable data transmission system that is capable of sending and/or receiving data communications over the carrier/communication system 54. For example, the server communication transceiver 72 is capable of receiving the privacy mode preference data from the VCP 22 of the vehicle 12. The server communication transceiver 72 can also transmit the privacy mode preference data (of an identified user) to the vehicle 12. The privacy mode preference data may be retrieved by the server communication transceiver 72 from a profile of a user (stored in the memory 68 or a database 77). The retrieval of preference data may be in response to a request for such data that is received from the VCP 22 of the vehicle 12. It is to be understood that the privacy mode preference data may be transmitted from the server 58 to any vehicle 12 (associated with the user) in which the connected device 14 is recognized. As such, any privacy mode preferences stored at the server 58 may be implemented in the vehicle 12, or another vehicle associated with the user, without prompting the user each time he/she enters either of the vehicles.

The database(s) 77 may be designed to store vehicle record(s), subscriber/user profile records, or any other pertinent subscriber and/or vehicle information and/or mobile communications device information. In an example, the database(s) 77 may be configured to store the user profile, which may contain personal information of the subscriber (e.g., the subscriber's name, privacy mode preference, a billing address, a home phone number, a cellular phone number, etc.) and/or information of the vehicle 12 (e.g., identification number, etc.). It is to be understood that the databases 77 may allow the center 60 to function as a repository for data collected from the vehicle 12. In some instances, another facility may function as a repository for the collected data (e.g., a customer relationship management system (not shown) associated with the center 60 whose database(s) the server 58 can access).

As illustrated in FIG. 2, the various center components may be coupled to one another via a network connection or bus 78 such as one similar to the vehicle bus 42 previously described.

In addition to the server 58, the center 60 may also include other components, such as additional processor(s) 76 and/or switch(es) 74. In some instance, the center 60 may also include advisor(s) (not shown). The additional processor(s) 76, which may be used in conjunction with telecommunication and computer equipment (not shown), may generally be equipped with suitable software and/or programs enabling the processor(s) 76 to accomplish a variety of center functions or tasks. The telecommunication and computer equipment (including computers) may include a network of servers (including server 58) coupled to both locally stored and remote databases (e.g., database 77) of any information processed. The switch(es) 74 may be private branch exchange (PBX) switch(es). The switch 74 routes incoming signals so that voice transmissions are usually sent to either a live advisor or an automated response system, and data transmissions are passed on to a modem or other piece of equipment (e.g., a communications module) for demodulation and further signal processing. Privacy mode preference information from the vehicle 12 and/or the connected device 14 and/or data requests from the vehicle 12 may be transmitted to the server 58.

Different components of the system 10, 10' may be used to perform different examples of the method for enabling or inhibiting short-range wireless communication privacy mode synchronization. One example of the method 100 is shown in FIG. 3.

Figure 3:
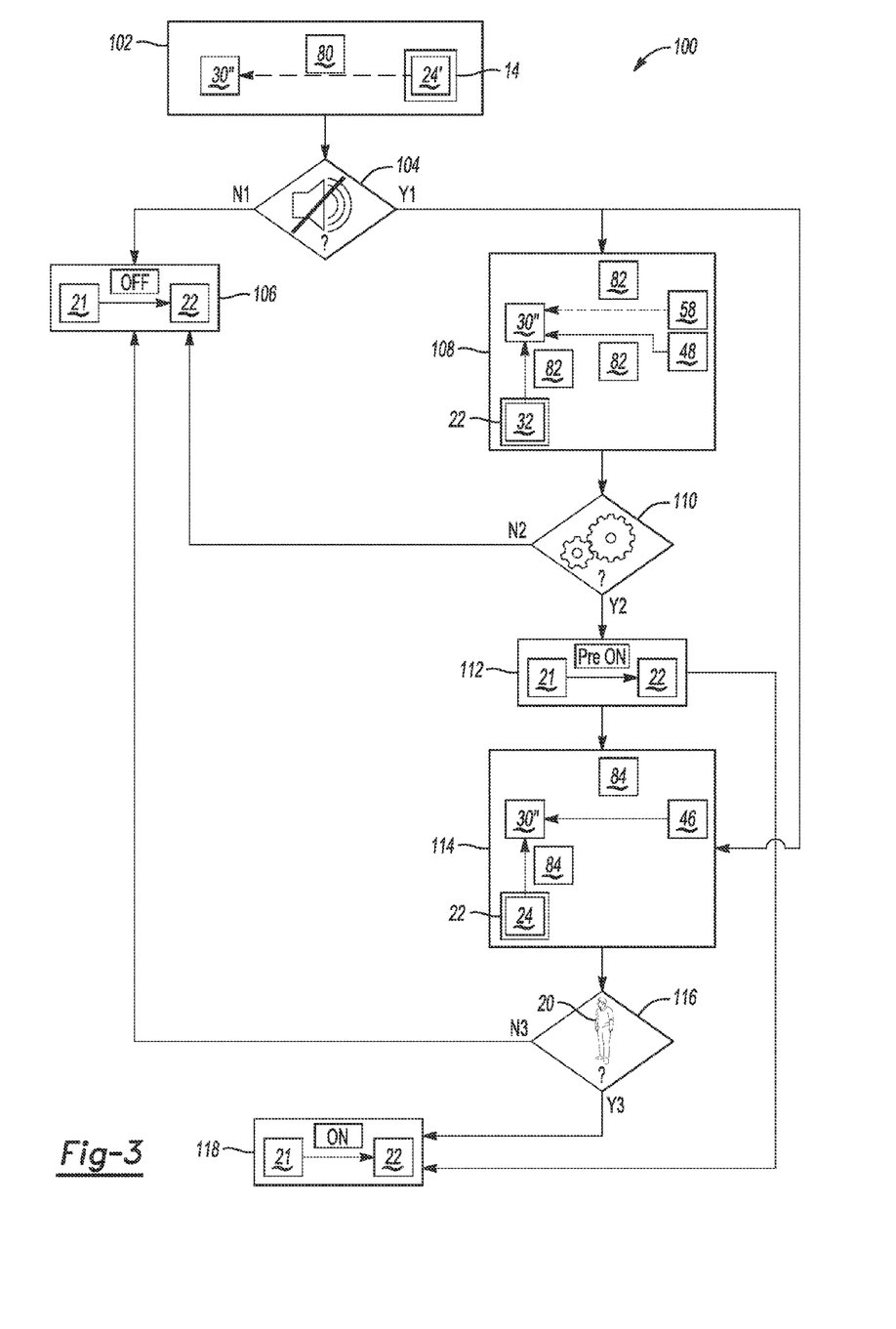
FIG. 3 is a flow diagram illustrating an example of a method for enabling or inhibiting synchronization of privacy settings.

In the example of the method 100 shown in FIG. 3, the mode of the control device 21 depends on whether a privacy setting of the connected mobile communications device 14 is on, whether privacy mode preference data indicates that the privacy setting of the connected device 14 should not be implemented in the vehicle 12, and whether a passenger 20 is present in the vehicle 12.

At reference numeral 102, privacy setting data 80 of the connected device 14 is received by the processor 30" of the control device 21. In one example, the processor 30" receives the privacy setting data 80 from the short-range wireless communication module 24, which receives the privacy setting data 80 directly from the short-range wireless communication module 24' of the connected device 14. The short-range wireless communication module 24' may send/push the privacy setting data 80 to the processor 30" (through short-range wireless communication module 24) without receiving a request from the vehicle 12. While not shown in FIG. 3, pairing with the vehicle 12 or detecting a change in a privacy setting of the connected device 14 (e.g., volume turned from off to on or volume turned from on to off) may prompt the short-range wireless communication module 24' to send the privacy setting data 80 to the processor 30" (through short-range wireless communication module 24). Alternatively, the receipt of the privacy setting data 80 from the short-range wireless communication module 24' may be in response to a request from the vehicle 12 (not shown). As an example, the short-range wireless communication module 24 of the vehicle 12 may recognize that the mobile communications device 14 has paired with the vehicle 12. The VCP 22 may transmit a data message (through the short-range wireless communication module 24) requesting the then-current privacy setting data 80 from the short-range wireless communication module 24' of the connected device 14. In response, the short-range wireless communication module 24' may retrieve the privacy setting data 80, and may transmit this information to the control device 21.

In still another example, the mobile communications device 14 is connected to the control device 21 through a cable or cord. The connected mobile communications device may send/push the privacy setting data 80 to the processor 30" without receiving a request from the vehicle 12 or after receiving a request from the vehicle 12.

Upon receiving the privacy setting data 80, the control device 21 (through processor 30" running computer-readable instructions 34") determines whether the privacy setting data 80 indicates that a privacy setting of the connected device 14 is on. This is shown at reference numeral 104.

When the privacy setting data 80 indicates that no privacy setting is on ("N1" in FIG. 3), the control device 21 is programed (by processor 30" running computer readable instructions 34") to enter privacy OFF mode and transmit privacy OFF mode instructions to the VCP 22. This is shown at reference numeral 106. The VCP 22 is responsive to the privacy OFF mode instructions from the control device 21. While the control device 21 is in the privacy OFF mode, the VCP 22 is inhibited from synchronizing the privacy setting of the connected device 14 to the vehicle notification setting.

In the privacy OFF mode, when an incoming call or message is received on the connected device 14, a notification may be processed on the display 50 or the speaker(s) 52 without interference.

Several variations of the method 100 may take place when the privacy setting data 80 indicates that the privacy setting is on ("Y1" in FIG. 3). In one example, the method 100 may involve receiving privacy mode preference data 82 and receiving passenger presence data 84 (e.g., reference numerals 108-116). In another example, the method 100 may involve receiving passenger presence data 84 (e.g., reference numerals 114 and 116) without receiving privacy mode preference data 82 (i.e., reference numerals 108-112). In still another example, the method 100 may involve receiving privacy mode preference data 82 (e.g., reference numerals 108-112) without receiving passenger presence data 84 (i.e., reference numerals 114-116). Each of these examples of the method 100 will be described in more detail below.

In an example, when the privacy setting data 80 indicates that a privacy setting of the connected device 14 is on ("Y1" in FIG. 3), processor 30" of the control device 21 receives privacy mode preference data 82. In one example, the privacy mode preference data 82 may be received directly from the electronic memory 32" or 32 that is onboard the vehicle 12. In another example, the privacy mode preference data 82 is received from the user interface 48 that is onboard the vehicle 12. In another example, the processor 30" receives the privacy mode preference data 82 from the server 58. This is shown at reference numeral 108.

While not shown in FIG. 3, the receipt of the privacy mode preference data 82 may be in response to a request from the vehicle 12. As an example, the control device 21 may recognize that the connected device 14 has a privacy setting turned on. In response, the VCP 22 may cause (through processor 30 running computer-readable instructions 34) the display 50 of the user interface 48 to show a message inquiring whether the privacy setting of the connected device 14 should be implemented in the vehicle 12. In response, a vehicle operator may input a privacy mode preference 82 at the user interface 48. The user interface 48 may then transmit the privacy mode preference data 82 to the processor 30, and the processor 30 may transmit the privacy mode preference data 82 to the processor 30". The VCP 22 may cause a setting implementation inquiry to be processed on the display 50 of the user interface 48 every time the connected device 14 is brought into the vehicle 12 or the VCP 22 may, after the privacy mode preference 82 is received at the user interface 48, cause (through processor 30 running computer-readable instructions 34) the display 50 of the user interface 48 to show a message inquiring whether the privacy mode preference 82 entered should be saved as a default. If the user indicates that the preference 82 should be saved as a default, the privacy mode preference data 82 may be stored on the electronic memory 32" or 32. In another example, the control device 21 may recognize that the connected device 14 has a privacy setting turned on. In response, the VCP 22 may transmit a data message (through communications module 36) requesting the then-current privacy mode preference data 82 from the server 58. In response, the server 58 may retrieve the last received privacy mode preference 82 (which may be transmitted to the server 58 when a vehicle operator inputs a privacy mode preference 82 at the user interface 48 and saved on the memory 68), and may transmit this information to the VCP 22. The VCP 22 may then transmit the privacy mode preference data 82 to the processor 30".

Upon receiving the privacy mode preference data 82, the control device 21 (through processor 30" running computer-readable instructions 34") determines whether the privacy mode preference data 82 indicates that the privacy setting of the connected device 14 should or should not be implemented in the vehicle 12. This is shown at reference numeral 110.

When the privacy mode preference data 82 indicates that the privacy setting of the connected device 14 should not be implemented in the vehicle 12 ("N2" in FIG. 3), the control device 21 is programed to enter privacy OFF mode and transmit privacy OFF mode instructions to the VCP 22, as shown at reference numeral 106.

If the privacy mode preference data 82 indicates that the privacy setting of the connected device 14 should be implemented in the vehicle 12 ("Y2" in FIG. 3), the control device 21 may enter a precursor mode to the privacy ON mode. The control device 21 is programed (by processor 30" running computer-readable instructions 34") to transmit Pre ON mode instructions to the VCP 22. This is shown at reference numeral 112.

In some examples, control device 21 is programed (by processor 30" running computer-readable instructions 34") to automatically and immediately enter privacy ON mode and transmit privacy ON mode instructions to the VCP 22 (step 118 in FIG. 3) when the control device 21 enters the precursor mode to the privacy ON mode.

In other examples, control device 21 is programed (by processor 30" running computer-readable instructions 34") to wait to receive more data (e.g., passenger presence data 84, as shown at step 114 in FIG. 3) before entering privacy ON mode or privacy OFF mode and transmitting privacy ON mode instructions or privacy OFF mode instruction to the VCP 22 (step 118 or step 106 in FIG. 3) when the control device 21 enters the precursor mode to the privacy ON mode.

At reference numeral 114, the processor 30" of the control device 21 receives the passenger presence data 84. As mentioned above, in examples of the method 100, this data 84 may be received with the privacy mode preference data 82 (i.e., coming from step 112) or without the privacy mode preference data 82 (i.e., coming from step 104). As an example of the latter, when the privacy setting data 80 indicates that a privacy setting of the connected device 14 is on ("Y1" in FIG. 3), the processor 30" of the control device 21 receives passenger presence data 84.

In some examples, the processor 30" receives the passenger presence data 84 from a vehicle sensor 46. The vehicle sensor 46 may be a seat belt sensor, an ultrasonic sensor, an automatic occupancy sensor, a camera, or a combination thereof. In other example, the processor 30" receives the passenger presence data 84 from the short-range wireless communication module 24. The passenger presence data 84 sensed by the short-range wireless communication module 24 may be data indicative of other paired mobile communications devices that are present in the vehicle 12.

Upon receiving the passenger presence data 84, the control device 21 (through processor 30" running computer-readable instructions 34") determines whether the passenger presence data 84 indicates that at least one passenger 20 is present in the vehicle 12. This is shown at reference numeral 116.

When the passenger presence data 84 indicates that no passengers 20 are present in the vehicle 12 ("N3" in FIG. 3), the control device 21 is programed to enter privacy OFF mode and transmit privacy OFF mode instructions to the VCP 22, as shown at reference numeral 106.

When the passenger presence data 84 indicates that at least one passenger 20 is present in the vehicle 12 ("Y3"), the control device 21 is programmed (by processor 30" running computer readable instructions 34") to enter privacy ON mode and transmit privacy ON mode instructions to the VCP 22. This is shown at reference numeral 118. The VCP 22 is responsive to the privacy ON mode instructions from the control device 21.

When the control device 21 is in the privacy ON mode, the VCP 22 is able to synchronize the privacy setting of the connected device 14 to the vehicle notification setting. The VCP 22 can restrict a notification of an incoming call or message. In one example, when an incoming call or message is received on the connected device 14, a visual notification is processed on the display 50 but an audio notification is restricted from being processed on the speaker(s) 52. The caller name or number or the message contents may appear on the display 50, but no sound will be played over the speaker(s) 52. In another example, when an incoming call or message is received on the connected device 14, both the visual notification and the audio notification are restricted from being processed by the VCP 22. No message will be shown on the display 50, and no sound will be played over the speaker(s) 52. If the user is a passenger 20 rather than a driver 18, it may be more appropriate to restrict both the visual notification and the audio notification. When an outgoing call is initiated by a user, the call is processed by the VCP 22 through the user interface normally with no restrictions.

Whether the control device 21 is in the privacy OFF mode (reference numeral 106) or the privacy ON mode (reference numeral 118), the method 100 disclosed herein may be repeated when updated privacy setting data, updated privacy mode preference data, or updated passenger presence data is received. As one example, the method 100 may be initiated each time the mobile communications device 14 is recognized in the vehicle 12 (e.g., upon vehicle 12 startup, or when the device is connected via a wire, etc.). As another example, the sensors 46 may continuously look for passengers, and the method 100 may begin at reference numeral 104, if during a trip, a passenger enters the vehicle 12. In another example, the processor 30' may continuously look for a change in the privacy setting of the connected device 14 (e.g., volume turned from off to on or volume turned from on to off). In this example, the method 100 may begin at reference numeral 102, if during a trip, a privacy setting of the connected device 14 is changed. These examples enable the control device 21 to be switched between the ON and OFF modes, depending upon whether a privacy setting of the connected device 14 is on, whether a privacy mode preference indicates that the privacy setting of the connected device 14 should not be implemented in the vehicle 12, and whether a passenger 20 is present in the vehicle 12.

One example of an algorithm that may be used by the control device 21 is:
Data preference=Privacy (on or off),
if Privacy=off then
   all communications can be allowed for notification else
   if passengers=true (the passenger interpretation=other phone present, other seats occupied from seat sensors or ultrasonics or cameras or seatbelt switches) then
     all communications (phone, text, e-mail, etc.) blocked from user notification else
     (since no passengers) all communications can be allowed.

When a privacy setting of a connected device 14 is on and a passenger 20 is present in the vehicle 12, a user may not want notifications of incoming calls and messages to be processed on the display 50 or speaker 52. The examples of the method 100 shown in FIG. 3 may allow a user to maintain privacy by restricting notifications of incoming calls and messages.

When more than one connected device is recognized by the short-range wireless communication module 24, it may be necessary for the system 10, 10' shown in FIGS. 1 and 2 or the method 100 shown in FIG. 3 to determine which of the connected devices is a highest priority device. The highest priority device is one of the several devices that is selected by the users 18, 20 as the device 14 (i.e., whose privacy setting may or may not be implemented as the vehicle notification setting). The privacy setting data 80 will be transmitted from the highest priority device (device 14), and notifications of incoming calls and messages received on the highest priority device will be restricted when the control device 21 enters privacy ON mode. The highest priority device may be a device that belongs to a driver 18 or a passenger 20.

In one example, the determination of which connected device is the highest priority is accomplished by referencing a priority list. The priority list may rank previously connected devices in order of highest priority. The priority list may be stored on the electronic memory 32 of the vehicle 12, the electronic memory 68 of the server 58, or in a database 77 of the center 60. In another example, the highest priority device determination is accomplished by determining which user is in the driver's seat. Biometrics of the driver, a driver preset setting (e.g., driver 1 seating, steering wheel, etc.), or radio frequency based telemetry may be used to determine which user is the driver 18. Each connected device may be associated with a user. The connected device associated with the user determined to be the driver 18 may be defined by the system 10, 10' or method 100 as the highest priority device. In another example, the highest priority device determination is accomplished by receiving input from a user through the user interface 48. When multiple connected devices are detected, the VCP 22 may cause the display 50 of the user interface 48 to show a message inquiring which device should be the highest priority. The device selected by the user may be defined as the highest priority device by the system 10, 10' or method 100.

Alternatively, when more than one connected device is recognized by the short-range wireless communication module 24, the system 10, 10' shown in FIGS. 1 and 2 or the method 100 shown in FIG. 3 may be applied to all connected devices 14. In one example, in-vehicle audio and visual notifications are restricted for all connected devices 14 with a privacy setting turned on (e.g., silent mode or a setting of a vehicle-related application resident on the memory 32' of the connected device 14). In another example, the users may input at the user interface 48 whether the privacy setting should be implemented for each connected device 14. For example, all recognized devices may be listed, and the user(s) can utilize the user interface 48 to indicate whether or not the privacy setting should be implemented. In a further example, the users may input at each connected device 14 whether the privacy setting should be implemented for that device 14. In any of these examples, the driver's device 14 may be set as the highest priority device, either by location, or through a preferred connection list which includes the driver's device, or by selection of the driver's device on the display. As the highest priority device, the driver 18 may select his/her set his/her connected device 14 to allow visual notifications of incoming calls and messages to be shown on the display 50 while maintaining the restriction of audio notifications. In this example, the remainder of the connected devices 14 may have both visual and audio notifications of incoming calls and messages restricted.

It is to be understood that the term "communication" as used herein is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A system, comprising:
a vehicle;
a vehicle communications platform operatively disposed in the vehicle, the vehicle communications platform in communication with a mobile communications device, the vehicle communications platform configured to determine whether the mobile communications device is a highest priority device; and
a control device configured to:
select a privacy ON mode or a privacy OFF mode responsive to a privacy setting received from the mobile communications device, wherein:
the privacy ON mode enables the vehicle communications platform to synchronize the privacy setting of the mobile communications device to a vehicle notification setting, wherein the privacy ON mode is triggered when the privacy setting of the mobile communications device is on, first passenger presence data indicates that at least one passenger is present in the vehicle, and a vehicle operator does not indicate through a user interface that the vehicle communications platform should not synchronize the privacy setting of the mobile communications device to the vehicle notification setting;
the privacy OFF mode inhibits the vehicle communications platform from synchronizing the privacy setting of the mobile communications device to the vehicle notification setting, wherein the privacy OFF mode is triggered when the privacy setting of the mobile communications device is off; and restrict at least one of a visible notification or an audible notification when the privacy ON mode is enabled and the mobile communications device is the highest priority device.

2. The system as defined in claim 1, further comprising:
a vehicle bus in communication with the vehicle communications platform;
a sensor interface connected to the vehicle bus; and
a vehicle sensor connected to the sensor interface,
wherein either the first passenger presence data or second passenger presence data is sensed by the vehicle sensor and communicated to the vehicle communications platform through the sensor interface and the vehicle bus.

3. The system as defined in claim 2 wherein the vehicle sensor is selected from the group consisting of a seat belt sensor, an ultrasonic sensor, an automatic occupancy sensor, and a camera.

4. The system as defined in claim 1 wherein the first passenger presence data includes data indicative of whether at least one other mobile communications device sensed by a short-range wireless communication module operatively connected to the vehicle communications platform.

5. The system as defined in claim 1, further comprising a server in communication with the vehicle communications platform, the server including a memory having stored therein a privacy mode preference.

6. The system as defined in claim 1 wherein the privacy setting of the mobile communications device is on when the mobile communications device is in silent mode.

7. The system as defined in claim 1 wherein the control device further includes:
a microprocessor;
a memory; and
computer readable instructions stored on the memory, the computer readable instructions, when executed by the microprocessor, are to:
i) determine whether the privacy setting of the mobile communications device is on or off;
ii) determine whether the first passenger presence data indicates that at least one passenger is present in the vehicle or second passenger presence data indicates that no passengers are present in the vehicle;
iii) determine whether the vehicle operator has indicated through the user interface that the vehicle communications platform should not synchronize the privacy setting of the mobile communications device to the vehicle notification setting; and
iv) transmit privacy mode instructions to the vehicle communications platform to select the privacy ON mode when (1) the privacy settings of the mobile communications device is on; (2) the first passenger presence data indicates that at least one passenger is present in the vehicle; and (3) the vehicle operator has not indicated through the user interface that the vehicle communications platform should not synchronize the privacy setting of the mobile communications device to the vehicle notification setting.

8. The system as defined in claim 7 wherein the memory of the control device has stored therein a privacy mode preference.

9. A computer implemented method for enabling or inhibiting privacy mode synchronization, comprising executing on a processor the steps of:

determining whether a mobile communications device is a highest priority device at a vehicle communications platform of a vehicle;
receiving privacy setting data of the mobile communications device;
receiving passenger presence data;
triggering a control device to enter a privacy ON mode when the privacy setting data of the mobile communications device indicates that a privacy setting of the mobile communications device is on and the passenger presence data indicates that at least one passenger is present in a vehicle;
triggering the control device to enter a privacy OFF mode when the privacy setting data of the mobile communications device indicates that the privacy setting of the mobile communications device is off or the passenger presence data indicates that no passengers are present in the vehicle; and
restricting at least one of a visible notification or an audible notification when the control module is in the privacy ON mode and the mobile communications device is the highest priority device.

10. The computer implemented method as defined in claim 9 wherein the control device enters the privacy ON mode, and wherein the method further comprises transmitting privacy ON mode instructions to the vehicle communications platform to synchronize the vehicle communications platform with the privacy setting of the mobile communications device in the vehicle.

11. The computer implemented method as defined in claim 9 wherein the control device enters the privacy OFF mode, and wherein the method further comprises transmitting privacy OFF mode instructions to the vehicle communications platform allowing the vehicle communications platform to provide notification of incoming calls from the mobile communications device.

12. The computer implemented method as defined in claim 9 wherein prior to receiving the privacy setting data of the mobile communications device, the method further comprises:
recognizing that the mobile communications device is in communication with a short-range wireless communication module of the vehicle communications platform; and
inquiring whether the privacy setting of the mobile communications device is on or off.

13. The computer implemented method as defined in claim 9 wherein the determining if the mobile communications device is the highest priority device is accomplished by referencing a priority list, detecting whether a user is located in a driver seat, or receiving input from a vehicle occupant through a user interface.

14. A method for improving a function of a vehicle communications platform, the method comprising:
recognizing a mobile communications device;
determining whether the mobile communications device is a highest priority device;
identifying, by a control device in communication with the vehicle communications platform, that a privacy setting of the mobile communications device is on;
displaying on a user interface within a vehicle a message inquiring whether the privacy setting of the mobile communications device is to be implemented in the vehicle;

in response to an input received at the user interface indicative of whether the privacy setting of the mobile communications device is to be implemented within the vehicle, one of:

triggering the control device to enter a precursor mode to a privacy ON mode, wherein the privacy ON mode enables the vehicle communications platform to synchronize the privacy setting of the mobile communications device to a vehicle notification setting; or triggering the control device to enter a privacy OFF mode inhibiting the vehicle communications platform from synchronizing the privacy setting of the mobile communications device to the vehicle notification setting; and restricting at least one of a visible notification or an audio notification when the control device is in the privacy ON mode and the mobile communications device is the highest priority device.

15. The method as defined in claim 14, further comprising:

receiving passenger presence data; and entering the privacy ON mode when the passenger presence data indicates that at least one passenger is present in the vehicle and the input indicates that the privacy setting of the mobile communications device is to be implemented within the vehicle.

16. The method as defined in claim 15, further comprising:

receiving an incoming call on the mobile communications device; and restricting a visible notification of the incoming call to the user interface of the vehicle.

17. The method as defined in claim 15, further comprising:

receiving an incoming call on the mobile communications device;

restricting an audio notification of the incoming call to a speaker of the vehicle; and causing the display of the user interface to show a visual notification of the incoming call when the control device is in the privacy ON mode and the mobile communications device is the highest priority device.

18. The method as defined in claim 14 wherein the control device enters the precursor mode to the privacy ON mode, and wherein the method further comprises:

receiving passenger presence data; and switching to the privacy OFF mode when the passenger presence data indicates that no passengers are present in the vehicle.

19. A system, comprising:

a mobile communications device;

a vehicle communications platform operatively disposed in a vehicle and configured to determine whether the mobile communications device is a highest priority device;

a short-range wireless communication module of the vehicle communications platform in wireless communication with the mobile communications device and to receive a privacy setting of the mobile communications device;

a control device to select a privacy ON mode or a privacy OFF mode responsive to the privacy setting received from the short-range wireless communication module, wherein the privacy ON mode enables the vehicle communications platform to synchronize a privacy setting of the mobile communications device to a vehicle notification setting;

a display of a user interface in communication with the vehicle communications platform, wherein the display, in response to the privacy ON mode, shows a visual notification of an incoming call received at the mobile communications device; and a speaker of the user interface in communication with the vehicle communications platform, wherein, in response to the privacy ON mode and the mobile communications device is the highest priority device, the control device is configured to prevent audio notification of the incoming call through the speaker.

* * * * *